(12) United States Patent
Hussain

(10) Patent No.: US 9,108,657 B2
(45) Date of Patent: Aug. 18, 2015

(54) CART BRAKING SYSTEM

(75) Inventor: Kamil Mohd Hussain, Katy, TX (US)

(73) Assignee: Cooper Technologies Company, Houston, TX (US)

(*) Notice: Subject to any disclaimer, the term of this patent is extended or adjusted under 35 U.S.C. 154(b) by 392 days.

(21) Appl. No.: 13/472,684

(22) Filed: May 16, 2012

(65) Prior Publication Data

US 2013/0306411 A1     Nov. 21, 2013

(51) Int. Cl.
| | |
|---|---|
| *B60T 1/14* | (2006.01) |
| *B62B 5/04* | (2006.01) |
| *B60T 3/00* | (2006.01) |
| *B60T 1/02* | (2006.01) |
| *B60T 1/04* | (2006.01) |

(52) U.S. Cl.
CPC ............... *B62B 5/0414* (2013.01); *B62B 5/049* (2013.01); *B62B 5/0442* (2013.01); *B60T 1/02* (2013.01); *B60T 1/04* (2013.01); *B60T 3/00* (2013.01)

(58) Field of Classification Search
CPC ............... B60T 1/00; B60T 1/02; B60T 1/04; B60T 3/00
USPC .............. 188/4 R, 5, 1.12, 19, 20, 32, 36–38; 410/30; 70/226; 280/33.994
See application file for complete search history.

(56) References Cited

U.S. PATENT DOCUMENTS

| | | | |
|---|---|---|---|
| 1,101,883 A | 6/1914 | Rochford | |
| 1,495,697 A | 5/1924 | Kosarik | |
| 1,898,896 A * | 2/1933 | Roihan | 188/4 R |
| 2,852,101 A | 9/1958 | Rappaport | |
| 3,042,151 A * | 7/1962 | Walker | 188/4 R |
| 3,517,776 A * | 6/1970 | Martino et al. | 188/4 R |
| 3,625,313 A | 12/1971 | Lowrie | |
| 3,701,396 A | 10/1972 | House | |
| 3,968,974 A | 7/1976 | Wetzel | |
| 4,128,144 A | 12/1978 | Vassar | |
| 4,248,445 A | 2/1981 | Vassar | |
| 5,624,224 A * | 4/1997 | Brandenburg | 414/490 |
| 5,722,515 A | 3/1998 | Wyse | |
| 6,371,496 B1 * | 4/2002 | Balolia | 280/35 |

(Continued)

FOREIGN PATENT DOCUMENTS

JP               11078900 A      3/1999

OTHER PUBLICATIONS

Translation of abstract of publication No. JP11078900; Mar. 23, 1999; 2 pages.

*Primary Examiner* — Melody Burch
(74) *Attorney, Agent, or Firm* — King & Spalding LLP

(57) ABSTRACT

A braking system for a cart is described herein. The braking system can include a pair of chocks positioned proximate to a wheel of a wheel assembly, where the wheel assembly is coupled to a cart frame. The braking system can also include a handle mechanically coupled to the cart frame, where the handle has an engaged position when a force is applied to the handle, and where the handle has a disengaged position when no force is applied to the handle. The braking system can also include a brake release mechanism coupled to the pair of chocks and the handle. When the handle is in the disengaged position, the pair of chocks are engaged with the wheel and the brake release mechanism is disengaged. When the handle is in the engaged position, the pair of chocks are disengaged from the wheel and the brake release mechanism is engaged.

17 Claims, 6 Drawing Sheets

(56) References Cited

U.S. PATENT DOCUMENTS

| | | |
|---|---|---|
| 6,378,956 B1 | 4/2002 | Van De Walker |
| 6,419,053 B1 | 7/2002 | Martin-Vegue et al. |
| 6,481,540 B1 | 11/2002 | Nolting, Jr. et al. |
| 7,753,177 B2 | 7/2010 | Slager |
| 8,074,775 B2 | 12/2011 | Arnold |
| 8,465,245 B2 * | 6/2013 | Manone et al. ............... 414/401 |
| 2004/0124040 A1 * | 7/2004 | Crowley ........................ 188/19 |
| 2005/0023787 A1 | 2/2005 | Haynes |

* cited by examiner

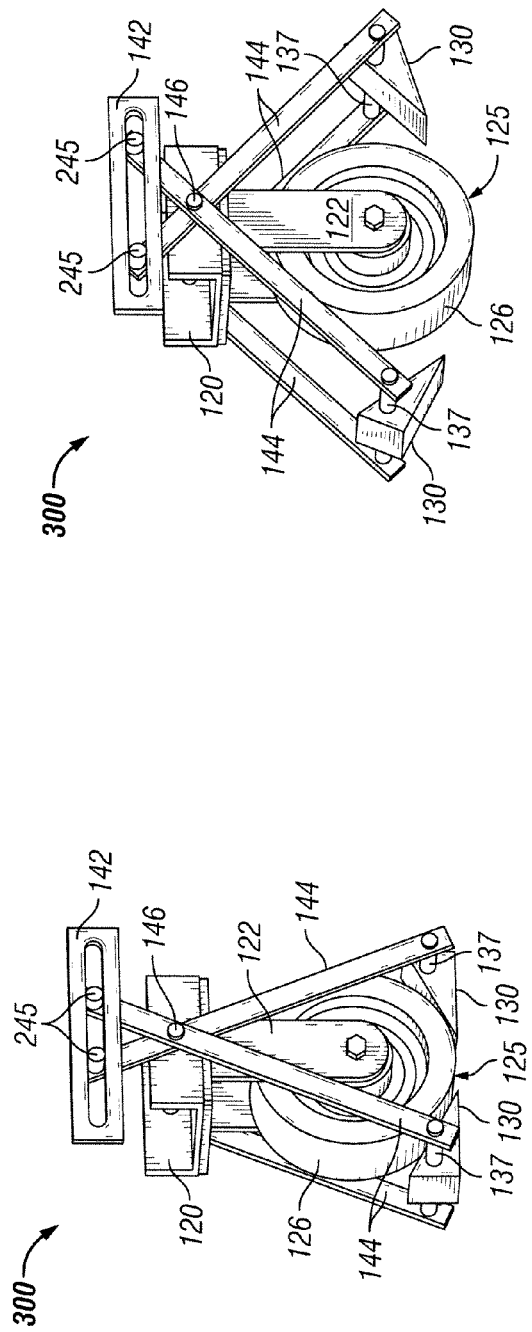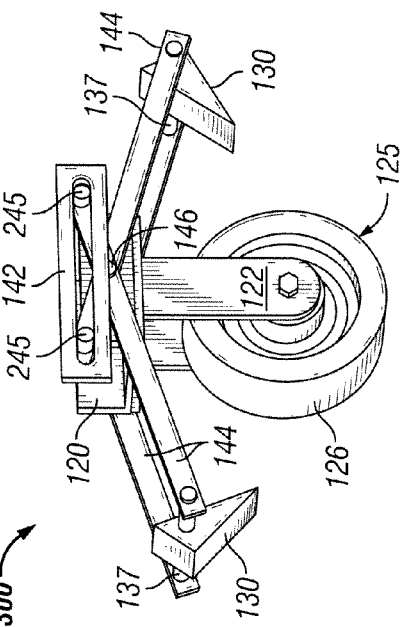

CART BRAKING SYSTEM

TECHNICAL FIELD

The present disclosure relates generally to cart braking systems and more particularly to systems, methods, and devices for a braking system for a cart that requires an active engagement by a user to disengage the braking system.

BACKGROUND

Many types of carts are used in a number of different applications. Examples of such carts include portable power carts, shopping carts, and equipment carts. Such carts have three or more wheels. At times, a cart has a braking mechanism to keep the cart stationary. When a cart carries a lot of weight, such as with a portable power cart, which can weigh approximately 2,500 pounds, the braking mechanism is important, especially from a safety perspective. When the cart is on unlevel ground, the braking system must work properly and reliably.

SUMMARY

In general, in one aspect, the disclosure relates to a braking system for a cart. The braking system can include a pair of chocks positioned proximate to a wheel of a wheel assembly, where the wheel assembly is coupled to a cart frame. The braking system can also include a handle mechanically coupled to the cart frame, where the handle has an engaged position when a force is applied to the handle, and where the handle has a disengaged position when no force is applied to the handle. The braking system can further include a brake release mechanism coupled to the pair of chocks and the handle, where, when the handle is in the disengaged position, the pair of chocks are engaged with the wheel and the brake release mechanism is disengaged, and where, when the handle is in the engaged position, the pair of chocks are disengaged from the wheel and the brake release mechanism is engaged.

In another aspect, the disclosure can generally relate to a method for controlling a breaking system for a cart. The method can include applying a first force to the handle, where applying the first force to the handle engages the handle and lifts a pair of chocks coupled to the handle and positioned proximate to a wheel of the cart. The method can also include applying, while the handle is engaged, a second force to the cart to move the cart. The method can further include removing the first force from the handle to disengage the handle, where applying the second force to the cart when the handle is disengaged fails to move the cart.

These and other aspects, objects, features, and embodiments will be apparent from the following description and the appended claims.

BRIEF DESCRIPTION OF THE DRAWINGS

The drawings illustrate only exemplary embodiments and are therefore not to be considered limiting in scope, as the exemplary embodiments may admit to other equally effective embodiments. The elements and features shown in the drawings are not necessarily to scale, emphasis instead being placed upon clearly illustrating the principles of the exemplary embodiments. Additionally, certain dimensions or positionings may be exaggerated to help visually convey such principles. In the drawings, reference numerals designate like or corresponding, but not necessarily identical, elements.

FIGS. 3A through 3C show various positions of an exemplary bracket assembly of a cart braking system in accordance with one or more exemplary embodiments.

DETAILED DESCRIPTION

In general, exemplary embodiments provide systems, methods, and devices for braking systems for a cart. Specifically, exemplary embodiments provide for an active-release of a braking system, so that the cart is only able to move while the braking system is actively disengaged. The cart brake release mechanism may be applied to one wheel of a cart, two wheels of a cart, or any other number of wheels of the cart. The normally-engaged cart brake release mechanism prevents the cart from moving when the cart is in use, in storage, or some other time when the cart is kept still.

While the exemplary embodiments discussed herein are with reference to power carts, other types of carts (e.g., shopping carts, dolleys, hand carts, flatbed carts) or any other type of wheel-based mobile device may be used in conjunction with exemplary embodiments.

A user may be any person that interacts with a cart. Examples of a user may include, but are not limited to, an engineer, an electrician, an instrumentation and controls technician, a mechanic, an operator, a consultant, a supervisor, a contractor, and a manufacturer's representative.

Figure 1A:
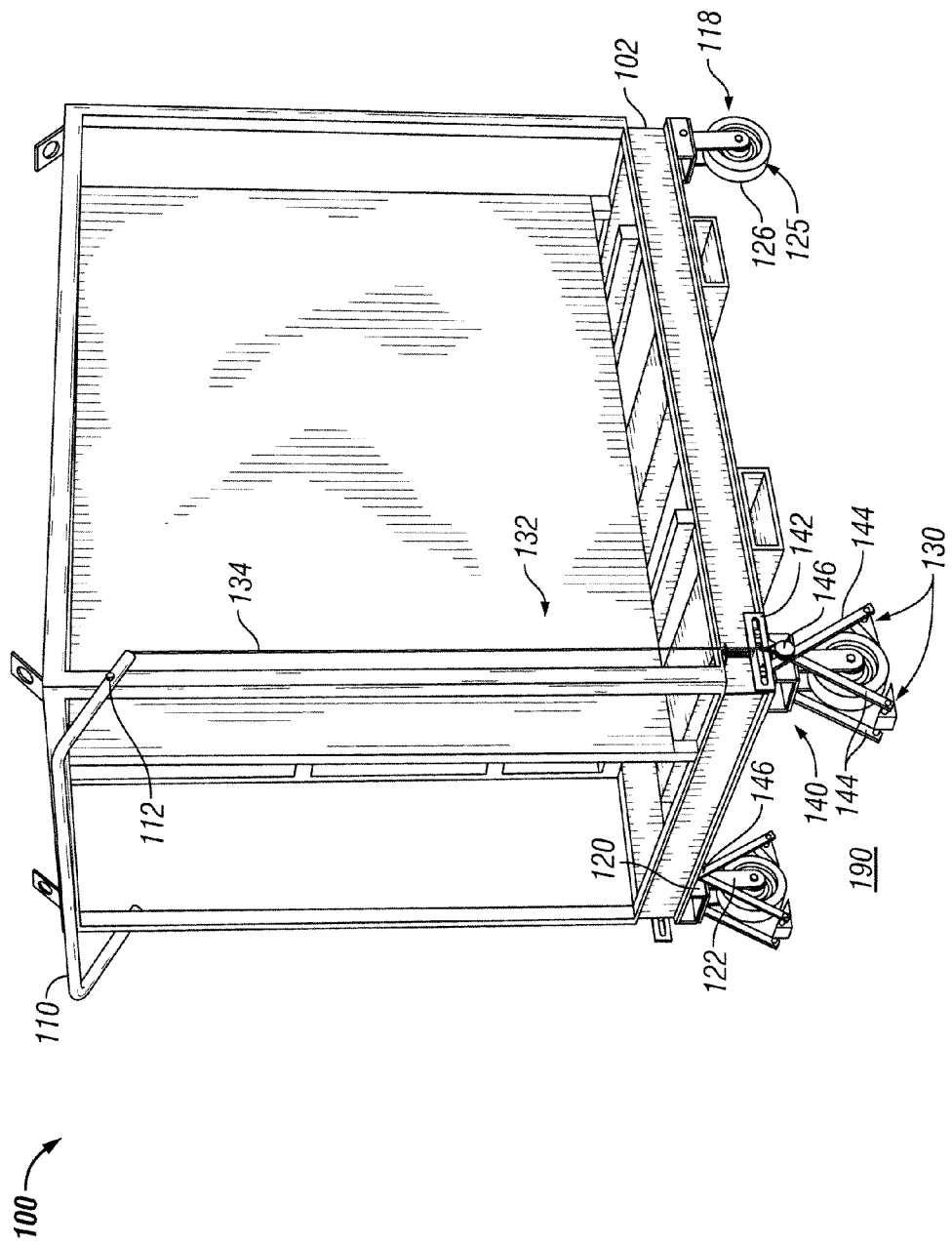
FIGS. 1A and 1B show various views of a cart with an exemplary cart braking system in which one or more exemplary embodiments may be implemented.
Figure 1B:
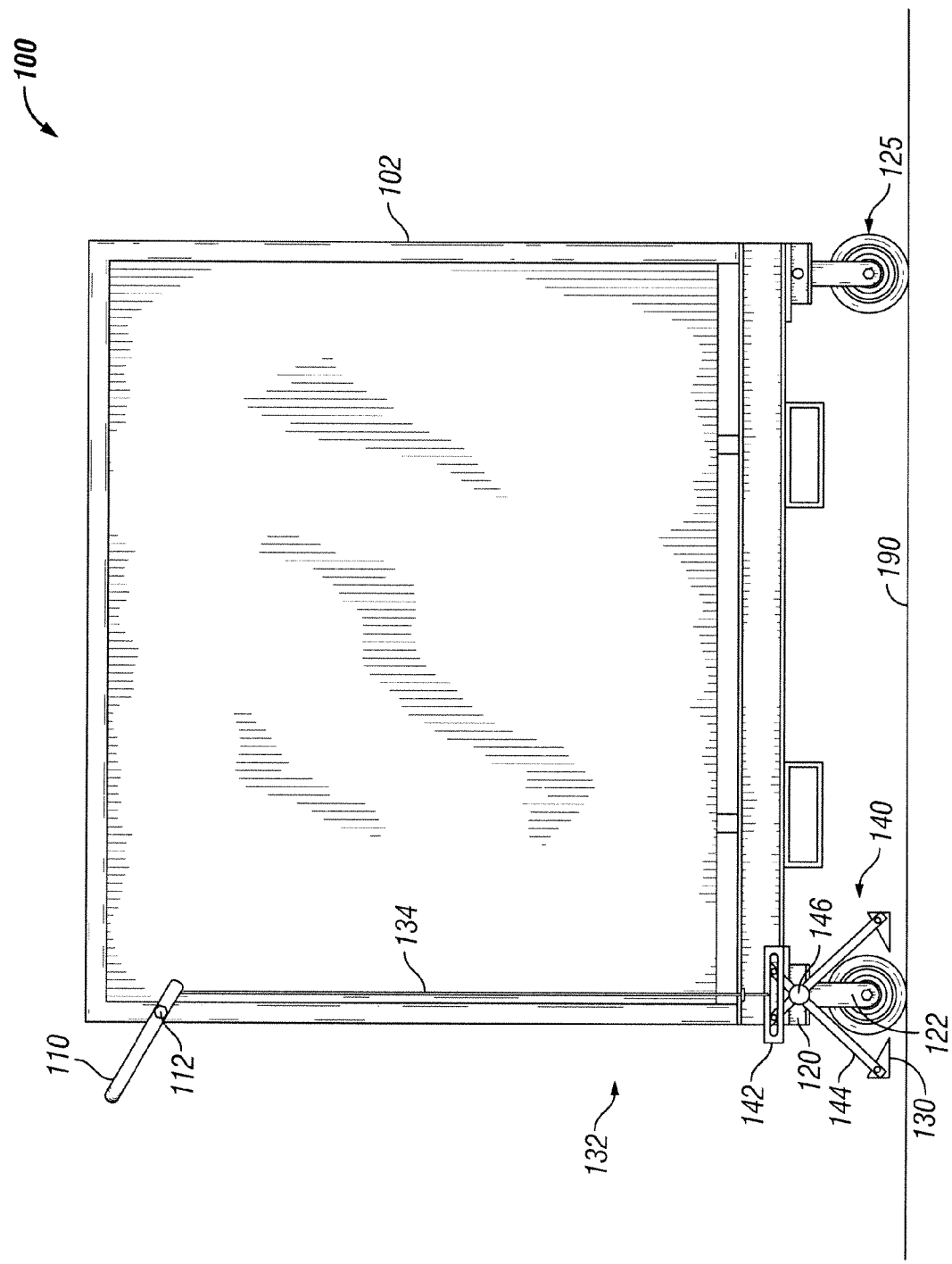

FIG. 1A shows a perspective view of a cart 100 with an exemplary cart brake release mechanism 132 in which one or more exemplary embodiments may be implemented. FIG. 1B shows a side view of the cart 100 with the exemplary cart brake release mechanism 132 in which one or more exemplary embodiments may be implemented. In one or more embodiments, one or more of the components shown in FIGS. 1A and 1B may be omitted, repeated, and/or substituted. Accordingly, embodiments of a cart brake release mechanism should not be considered limited to the specific arrangements of components shown in FIGS. 1A and 1B.

Referring now to FIGS. 1A and 1B, the cart 100 includes a cart frame 102, on which is disposed a handle 110, the brake release mechanism 132, at least one pair of chocks 130 located proximately to a wheel assembly 118 (also called a caster 118). The brake release mechanism 132 includes a linking device 134 and a bracket assembly 140. The bracket assembly 140 of the brake release mechanism 132 includes a slotted portion 142, at least one pair of crossing rods 144, and a nexus 146. The wheel assembly 118 includes a wheel 125, a wheel base 120, and a fork 122. These components are described in more detail below.

In certain exemplary embodiments, the cart frame 102 of the cart 100 is configured to hold and transport one or more pieces of equipment (e.g., a motor, a transformer, tools, parts) from one location to another location. The cart frame 102 has one or more of a number of configurations. For example, the cart frame 102 may have one or more shelves, one or more open platforms, one or more open ends or sides. The cart frame 102 may be made of one or more of any number of suitable materials, including but not limited to wood, metal, plastic, and fiberglass.

When the cart 100 is a power cart, the cart frame 102 may have a number of features. For example, a cart frame 102 of a power cart may include, among other features, a mounting shelf with a transformer, a power source, one or more sturdy shelves to hold heavy equipment (e.g., motors), one or more power receptacles, and/or hanging features to hold cable, wires, and test leads.

The cart 100 is moved from one location to another using one or more wheel assemblies 118. In certain exemplary embodiments, the wheel assemblies 118 are located on the underside and/or toward the bottom portion of the cart frame 102. For example, as shown in FIG. 1A, a wheel assembly 118 may be positioned and mechanically coupled to each corner of the underside of the cart frame 102. The wheels 125 of the wheel assemblies 118 roll on a ground surface 190 to allow the cart 100 to move from one location to another location. Specifically, the wheel 125 has a wheel surface 126 that contacts the ground surface 190. The wheel surface 126 may be rounded and/or flat. The wheel surface may have treads, knobs, and/or other surface features. The wheels 125 are substantially round, when looked at from a side view, and may be made of one or more of a number of suitable materials, including but not limited to rubber, plastic, and metal. The wheel 125 may have one or more other components, including but not limited to a rim, one or more spokes, and a hubcap.

The wheel assembly 118 is mechanically coupled to the cart frame 102 by the wheel base 120. The wheel base 120 secures the wheel assembly 118 to the cart frame 102. Specifically, the wheel base 120 is mechanically coupled to a top end of the fork 122. The wheel base 120 may be coupled to the cart frame 102 and/or the fork 122 using one or more of a number of methods, including but not limited to epoxy, fastening devices (e.g., bolts, screws), mating screws, compression fittings, and welding. The wheel base 120 may be made of one or more of a number of suitable materials, including but not limited to metal, plastic, and rubber.

The bottom end of the fork 122 mechanically couples to the wheel 125 in a manner that allows the wheel 125 to rotate around an axis at the point of coupling. The axis may be defined by a fastening device, such as a pin or bolt. The fork 122 may be fixedly or rotatably coupled to the wheel base 120. In addition, or in the alternative, a portion of the fork 122 may include a rotatable portion that allows the wheel 125 to turn. In the alternative, the components of the wheel assembly may be fixedly coupled together, preventing the wheel 125 from turning. The fork 122 may be configured to traverse down one or both sides of the wheel 125. The fork 122 may be made of one or more of any number of suitable materials, including but not limited to wood, metal, and plastic.

In certain exemplary embodiments, the handle 110 is mechanically coupled to the cart frame 102. The handle 110 is movably coupled to the cart, so that the movement of the handle 110 can engage and/or disengage the braking system for the cart 100. Specifically, when a force is applied to the handle 110 (thus engaging the handle 110), the handle is moved from a disengaged position to an engaged position. When the force is removed from the handle 110, then the handle 110 reverts from the engaged position to the disengaged position. For example, as shown in FIGS. 1A and 1B, the handle may be hingedly coupled to either side of the cart frame 102 using one or more fastening devices 112. The fastening device 112 may be a bolt, a pin, or any other suitable device that hingedly couples the handle 110 to the cart frame 102. Depending on the configuration, the force applied to the handle 110 may cause the distal end of the handle 110 to move further away from, or closer to, the ground surface 190. In certain exemplary embodiments, the force applied to the handle 110 causes the handle to move in one or more other directions, such as horizontally (toward and/or away from the user applying such force).

The handle 110 may be made of one or more of any number of suitable materials, including but not limited to wood, metal, rubber, and plastic. The handle 110 may be a continuous piece or multiple pieces coupled together. The handle 110 may be different from another optional handle coupled to the cart frame 102, where the other handle is not coupled to the braking system described herein. The handle 110 may be located on an end of the cart frame 102. For example, the handle 110 may be positioned on the same end of the cart as two or more wheels 125 on which exemplary embodiments are used.

In certain exemplary embodiments, at least one distal end of the handle 110 is mechanically coupled to the brake release mechanism 132. Specifically, as shown in FIGS. 1A and 1B, the distal end of the handle 110 is mechanically coupled to the linking device 134 of the brake release mechanism 132. The linking device 134 provides a mechanical link between the handle 110 and the bracket assembly 140. As the handle 110 moves, the linking device 134 causes the bracket assembly 140 to move correspondingly. Specifically, as the handle 110 is engaged, the linking device 134 causes the bracket assembly 140 to disengage the pair of chocks 130 from the wheel 125. Likewise, as the as the handle 110 is disengaged, the linking device 134 causes the bracket assembly 140 to engage the pair of chocks 130 from the wheel 125.

In certain exemplary embodiments, the linking device 134 is a cable, a chain, a tube, a pipe, and/or some other suitable shape. The linking device 134 may be flexible and/or rigid. For example, as described in FIGS. 2A and 2B below, the bottom portion of the linking device 134 is flexible to wrap around at least a portion of a pulley. The linking device 134 may be made of one or more of a number of suitable materials, including but not limited to metal, plastic, nylon, and rubber. The linking device 134 may be mechanically coupled to the handle 110 using one or more of a number of methods, including but not limited to epoxy, fastening devices (e.g., bolts, screws), mating screws, knots, compression fittings, and welding.

In certain exemplary embodiments, the slotted portion 142 of the bracket assembly 140 provides the mechanism to raise and lower the pair of chocks 130 about the wheel 125. The slotted portion 142 has at least one slot that is straight (e.g., horizontal), an inverted V-shape, or any other suitable configuration. The slotted portion 142 can be mechanically coupled to the distal end of the linking device 134 using one or more of a number of fastening mechanisms, including but not limited to epoxy, fastening devices (e.g., bolts, screws), mating screws, knots, compression fittings, and welding. There may be one slotted portion 142 for each wheel 125, where the slotted portion 142 is positioned above the wheel 125. The slotted portion 142 may be made of one or more of a number of materials, including but not limited to metal and plastic.

The slotted portion 142 may raise and/or lower based on one or more forces applied to the slotted portion 142. For example, an upward force may be applied to the slotted portion 142 by the linking device 134 when the handle 110 is engaged, lifting the linking device 134 away from the ground surface 190. Similarly, when used with a pulley (described below with respect to FIG. 2A) or similar device, the linking device 134 may apply a downward force to the slotted portion 142. As another example, when the handle is disengaged, the force of gravity may cause the chocks 130 to lower toward the ground surface 190, which may raise or lower (depending on how the bracket assembly is configured) the slotted portion 142. Other forces may be applied by other devices (such as a spring, described below with respect to FIG. 2B) to affect the position of the slotted portion 142.

In certain exemplary embodiments, the slotted portion 142 is positioned proximate to the wheel base. The slotted portion 142 is movably coupled to the pair of crossing rods 144. For example, the slotted portion 142 may move upward or downward, depending on whether the pair of chocks 130 are engaging with the wheel 125 or disengaging with the wheel 125, respectively. In such a case, while the slotted portion 142 is moving, one or both of the pair of crossing rods 144 slide along the slot in the slotted portion. Specifically, as the slotted portion 142 is lowered by the linking device 134 (which can occur when a force is applied to the handle 110 to engage the handle 110), the proximal end of each of the pair of crossing rods 144 travels along the slot in the slotted portion 142 from the center of the slotted portion 142 to either end of the slotted portion 142. Conversely, as the slotted portion 142 is raised (which can occur when the handle 110 is disengaged), the proximal end of each of the pair of crossing rods 144 travels along the slot in the slotted portion 142 from either end of the slotted portion 142 to the center of the slotted portion 142.

In certain exemplary embodiments, when the pair of crossing rods 144 is slidably coupled to the slotted portion 142, the proximal end of each of the pair of crossing rods 144 may include a protrusion, which is described below in more detail with respect to FIGS. 2A and 2B. The pair of crossing rods 144 intersects at a nexus 146, which is positioned between the proximal end and the distal end of each of the pair of crossing rods 144. Each of the pair of crossing rods 144 may have substantially similar and/or different dimensions (e.g., length, width, height). The nexus 146 may be positioned at the same location on each of the pair of crossing rods 144 or in a different location on each of the pair of crossing rods 144. The distal end of each of the pair of crossing rods 144 is mechanically coupled to each of the pair of chocks 130.

In one or more exemplary embodiments, there may be two pairs of crossing rods 144 for each wheel 125. In such a case, one pair of crossing rods 144 is positioned next to the outside-facing side of the wheel 125 and is mechanically coupled to the slotted portion 142, as described above. The second pair of crossing rods 144 may be positioned next to the inside-facing side of the wheel 125 and is mechanically coupled to the wheel base 120 of the wheel assembly 118. In such a case, the nexus 146 is located at or near the proximal end of each of the pair of crossing rods 144. The crossing rods 144 positioned next to the inside-facing side of the wheel 125 are shorter than the crossing rods 144 positioned next to the outside-facing side of the wheel 125. The nexus 146 may be mechanically coupled to the wheel base 120.

Whether each wheel 125 has one or two pairs of crossing rods 144, the distal end of each of the crossing rods 144 is mechanically coupled to one of the pair of chocks 130. Each crossing rod 144 may be coupled to a chock 130 using one or more of a number of mechanisms, including but not limited to a pin, a bolt, a screw, epoxy, mating threads, a compression fitting, and welding. The coupling between the crossing rod 144 and the chock 130 may be fixed or movable in some way (e.g., rotatably movable). When there are two pairs of crossing rods 144 positioned about a single wheel 125 (e.g., one pair next to the inside-facing side of the wheel 125 and the other pair next to the outside-facing side of the wheel 125), the chocks 130 and the distal ends of a crossing rod 144 from each pair of crossing rods 144 may be mechanically coupled by one or more mechanisms (e.g., pin 137) that each traverse all or part of the chock 130.

In certain exemplary embodiments, each chock 130 is a wedge-shaped device that engages a wheel 125 by being wedged between a surface of the wheel 125 (i.e., a wheel surface 126) and a ground surface 190. In such a case, the handle 110 is disengaged, which disengages the brake release mechanism 132. When the handle 110 is engaged, which engages the brake release mechanism 132, the chocks 130 are disengaged from the wheel 125 so that each chock 130 avoids contact with the wheel surface 126 and with the ground surface 190.

The chocks 130 may be made of one or more of a number of suitable materials, including but not limited to rubber, plastic, metal, and stone. The outer surfaces of the chock 130, particularly the surfaces that contact the wheel surface 126 and/or the ground surface 190, may be textured and/or coated to provide for added friction to avoid slippage on such surfaces. Each chock 130 may have substantially similar dimensions (e.g., height, length, width) and/or characteristics (e.g., weight, material, color) as the other chocks 130 on the cart 100.

Figure 2A:
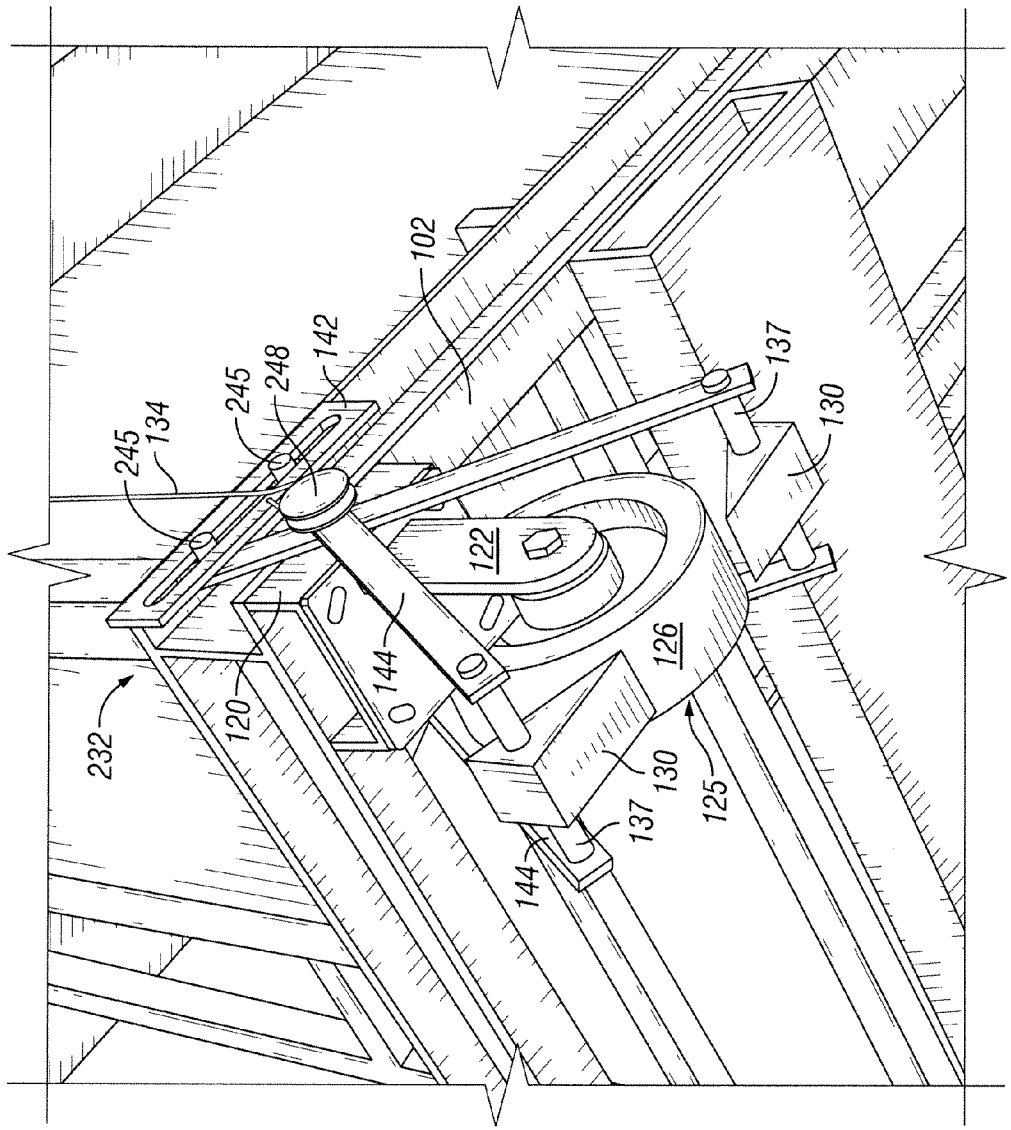
FIGS. 2A and 2B show various views detailing an exemplary cart braking system in accordance with one or more exemplary embodiments.

FIG. 2A shows a bottom perspective view of a cart 200 with an exemplary cart brake release mechanism 232 in which one or more exemplary embodiments may be implemented. FIG. 2B shows a side perspective view of the cart 202 with the exemplary cart brake release mechanism 233 in which one or more exemplary embodiments may be implemented. In one or more embodiments, one or more of the components shown in FIGS. 2A and 2B may be omitted, repeated, and/or substituted. Accordingly, embodiments of a cart braking system should not be considered limited to the specific arrangements of components shown in FIGS. 2A and 2B.

Referring to FIG. 2A, the brake release mechanism 232 of the cart 200 includes substantially all of the components of the brake release mechanism 132 of FIGS. 1A and 1B above. In addition, the brake release mechanism 232 of the cart 200 includes a pulley 248. The pulley 248 may be positioned at one of a number of locations on the cart 200. In this example, the pulley 248 is rotationally coupled to the nexus 146, which is coupled to the wheel base 120. Some or all of the pulley 248 may have one or more slots that receive a portion of the linking device 134. The direction of the linking device 134 may be altered because of the pulley 248. For example, as shown in FIG. 2A, the linking portion 134 drops substantially vertically from the handle (not shown) to the pulley 248, wraps around the lower half of the pulley 248, and couples to the slotted portion 142, located above the pulley 248. In such a case, the linking portion 134 couples to the slotted portion 142 in one or more of the manners described above with respect to FIGS. 1A and 1B. The pulley 248 may be spring-aided, include one or more gears, and/or otherwise include a device to assist in raising and/or lowering the slotted portion 142 (and so, in turn, engaging and/or disengaging the chocks 130 from the wheel surface 126 and ground surface 190).

In certain exemplary embodiments, the proximal end of each crossing rod 144 that couples to the slotted portion 142 includes one or more protrusions 245 to keep the crossing rod 144 properly aligned and within the slotted portion 142 as the slotted portions moves. As explained above, when the crossing rods 144 are properly aligned, as the slotted portion 142 changes position, the crossing rods 144 slide within the slotted portion 142, which causes the chocks 130 to engage or disengage the wheel surface 126 and the ground surface 190. The protrusion 245 may have one or more of a number of suitable lengths, widths, shapes, and/or one or more additional features (e.g., flanged end) to allow the associated crossing rod 144 to move with as little resistance as possible relative to the slotted portion 142 and/or to keep the protrusion 245 within the slot of the slotted portion 142.

Figure 2B:
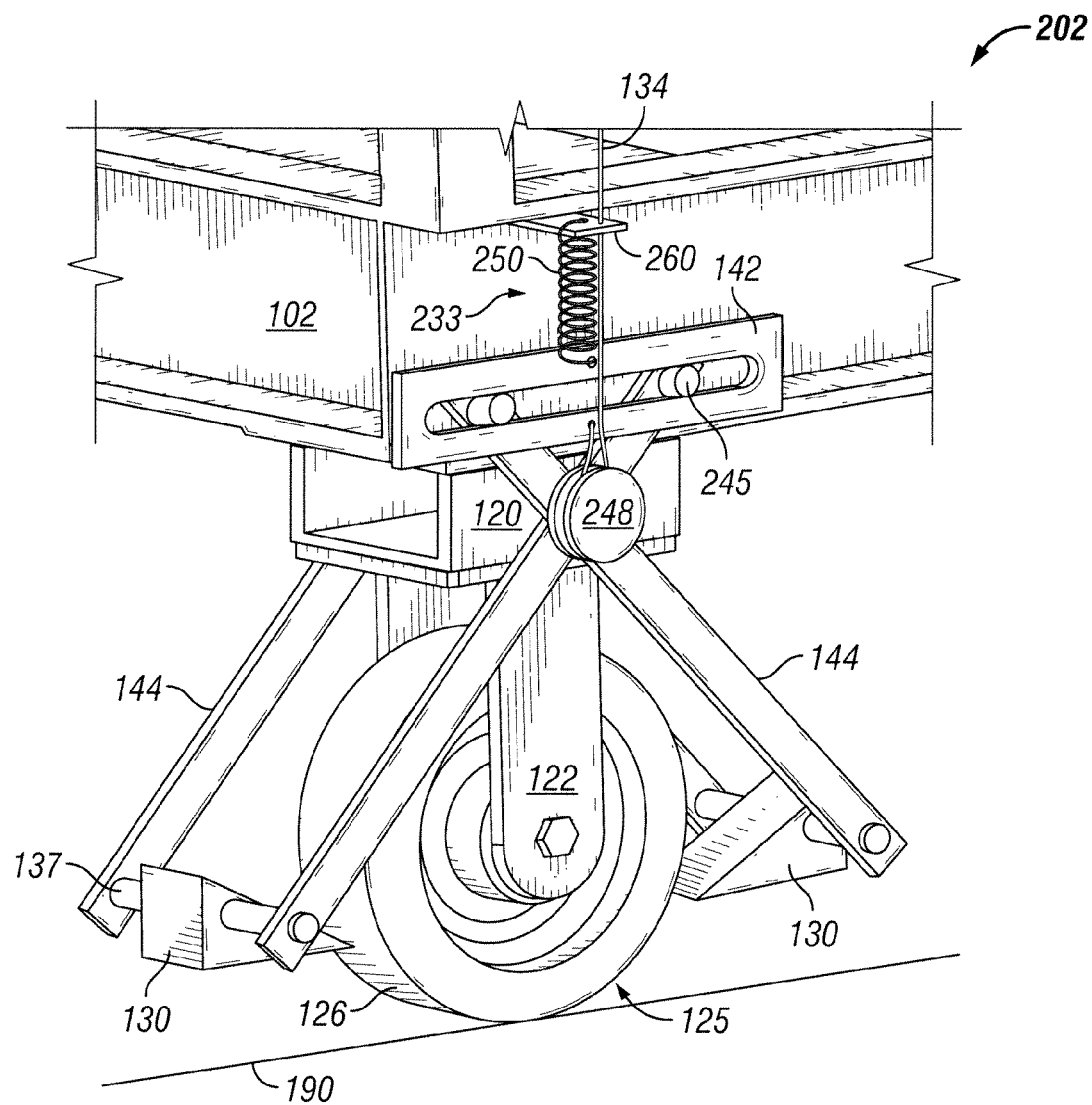

Referring to FIG. 2B, the brake release mechanism 233 of the cart 202 is substantially the same as the brake release mechanism 232 of the cart 200 of FIG. 2A with a spring 250 and spring bracket 260 added. The spring 250 acts with a force to ease the movement of the slotted portion 142, which in turn eases the engagement and/or disengagement of the chocks 130 with the wheel surface 126 and the ground surface 190. The spring 250 may be a tension spring, a torsion spring, a clock spring, a compression spring, or any other suitable type of spring. In the example shown in FIG. 2B, the spring is a tension spring. In other words, the spring 250 is stretched when the chocks 130 are disengaged from the wheel surface 126 and the ground surface 190 (i.e., the braking system is disengaged). The stretched spring 250 applies a force that encourages the braking system to return to an engaged state.

The distal end of the spring 250 shown in FIG. 2B is mechanically coupled to the slotted portion 142. Thus, as shown, the slotted portion 142 is mechanically coupled to the spring 250 and the linking portion 134, where the spring 250 and the linking portion 134 apply opposite forces to the slotted portion 142. The proximal end of the spring 250 is mechanically coupled to a spring bracket 260. In certain exemplary embodiments, the spring bracket 260 is a part of the cart frame 102 or a separate piece that is mechanically coupled to the cart frame 102. The spring bracket 260 may be coupled to the cart frame 102 using one or more of a number of methods, including but not limited to, epoxy, fastening devices (e.g., bolts, screws), mating screws, compression fittings, and welding. The spring bracket 260 may be made of one or more of a number of suitable materials, including but not limited to metal, plastic, and rubber.

The spring bracket 260 has dimensions (e.g., length, width, thickness) suitable to provide support for the distal end of the spring 250. The spring bracket 260 may be flat, curved, angled, and/or have any other suitable shape. The spring bracket 260 may be positioned in any suitable location to allow the spring 250 to apply force in the direction for which the braking system is designed. For example, as shown in FIG. 2B, the spring bracket 260 is positioned proximate to and above the slotted portion 142.

The spring 250 may have one or more of a number of characteristics, which depend, at least in part, on the configuration of the braking system relative to the position of the spring 250. In addition to spring type (e.g., tension, compression), other characteristics of the spring 250 that may vary include, but are not limited to, thickness, material, length, and coil width.

In addition, or in the alternative, one or more other springs 250 and/or spring brackets 260 may be positioned in one or more other locations on the cart 202. For example, a spring may be mechanically coupled to the handle 110 to apply a force that encourages the handle 110 to be in the disengaged position, thus engaging the braking system. In such a case, the opposite end of the spring may be mechanically coupled to a spring bracket that is coupled to the cart frame 102 at a location proximate to (e.g., below) a portion (e.g., the distal end) of the handle 110.

In certain exemplary embodiments, one or more additional components may be added to the cart 202 to enhance the functionality of the exemplary braking system. For example, a locking feature (not shown) may be added to hold the handle 110 in the engaged and/or disengaged position while the locking feature is engaged. Examples of such a locking feature may include, but are not limited to, a latch, a clip, and a strap.

FIGS. 3A through 3C show various positions of a portion of an exemplary braking release mechanism 300 in accordance with one or more exemplary embodiments. Specifically, FIGS. 3A through 3C show how the components of the brake release mechanism 300 move in relation to each other to engage and disengage the chocks 130 from the wheel surface 126 and the ground surface 190. Referring to FIG. 3A, the braking system is engaged. In other words, the chocks 130 are wedged between the wheel surface 126 and the ground surface 190 on both sides of the wheel 125. The chocks 130 are mechanically coupled to a distal end of a crossing rod 144 on either side of the chock 130 by a pin 134 that traverses the chock 130.

The crossing rods 144 positioned adjacent to the near side (i.e., the outside-facing side of the wheel 125) cross at the nexus 146, which is mechanically coupled to the wheel base 120. The nexus 146 is located some distance away from the proximal end of the crossing rods 144. A protrusion 245 is positioned at the proximal end of the crossing rods 144, where the protrusions 245 protrude through the slot in the slotted portion 142. In this position, where the chocks 130 are engaged with the wheel surface 126 and the ground surface 190, the protrusions 245 are positioned close to at least one part (e.g., the horizontal center) of the slotted portion 142. A linking device (not shown) is mechanically coupled to the slotted portion 142.

Also, the crossing rods 144 positioned adjacent to the far side (i.e., the inside-facing side of the wheel 125) cross at a nexus (not shown), which is mechanically coupled to the other side of the wheel base 120. The nexus in this case is located at the proximal end of the crossing rods 144.

In FIG. 3B, a force is applied to the handle (not shown) to begin engaging the brake release mechanism 300. In this case, the slotted portion 142 is forced downward, causing the distance between the slotted portion 142 and the nexus 146 to decrease. As a result, the protrusions 245 are forced to move toward the outer portions of the slot in the slotted portion 142. As this occurs, the crossing rods 144 pivot at the nexus 146 and cause the chocks 130 to separate from the wheel surface 126 and the ground surface 190.

In FIG. 3C, the brake release mechanism 300 is fully engaged. The slotted portion 142 is forced even further downward, further causing the distance between the slotted portion 142 and the nexus 146 to decrease. As a result, the protrusions 245 are forced to the far outer portions of the slot in the slotted portion 142. As this occurs, the crossing rods 144 continue to pivot at the nexus 146 and cause the chocks 130 to fully separate from the wheel surface 126 and the ground surface 190. When the brake release mechanism 300 is disengaged, the process described above is performed in reverse.

While exemplary embodiments described herein use a pair of chocks to engage the wheel surface and ground surface, other components may be used instead of, or in addition to, the pair of chocks. For example, one or more pads can contact a wheel surface and/or the ground surface when the brake release mechanism is disengaged, where the pads provide enough friction to the wheel surface and/or the ground surface to prevent the cart from moving while the brake release mechanism is disengaged. When the brake release mechanism is engaged, the pads would be lifted and removed from the wheel surface and/or the ground surface to allow the cart to move. As another example, one or more poles can contact a wheel surface and/or the ground surface when the brake release mechanism is disengaged, where the poles provide enough friction to the wheel surface and/or the ground surface to prevent the cart from moving while the brake release mechanism is disengaged. When the brake release mechanism is engaged, the poles would be lifted and removed from the wheel surface and/or the ground surface to allow the cart to move.

Regardless of the components (e.g., chocks, pads, poles) incorporated into an exemplary brake release mechanism, such components can engage the wheel surface and/or the ground surface while all wheels of the cart make direct physical contact with the ground surface. Alternatively, one or more wheels of the cart can be physically separated from the ground surface by one or more components of the brake release mechanism when the brake release mechanism is disengaged. In such a case, when the brake release mechanism is engaged, the one or more wheels is placed back (e.g., lowered) in physical contact with the ground surface.

Figure 4:
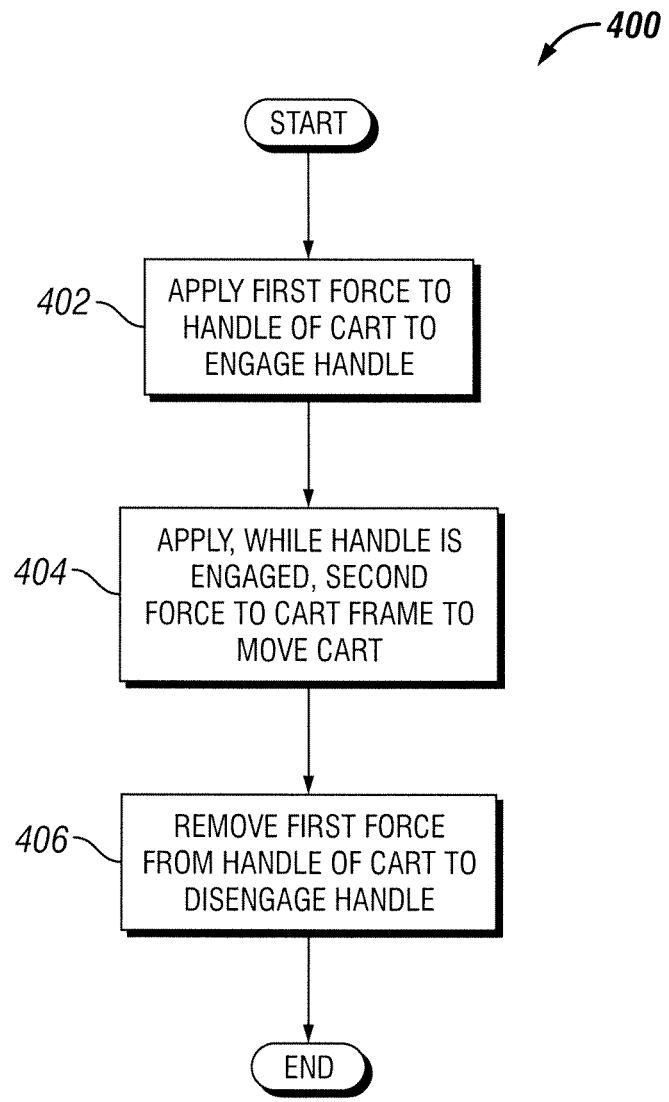
FIG. 4 shows a flowchart of a method for controlling a cart braking system in accordance with one or more exemplary embodiments.

FIG. 4 shows a flowchart of a method 400 for controlling a cart braking system in accordance with one or more exemplary embodiments. While the various steps in this flowchart are presented and described sequentially, one of ordinary skill will appreciate that some or all of the steps may be executed in different orders, may be combined or omitted, and some or all of the steps may be executed in parallel. Further, in certain exemplary embodiments, one or more of the steps described below may be omitted, repeated, and/or performed in a different order. In addition, a person of ordinary skill in the art will appreciate that additional steps, omitted in FIG. 4, may be included in performing this method. Accordingly, the specific arrangement of steps shown in FIG. 4 should not be construed as limiting the scope.

Referring now to FIGS. 1-4, the method 400 begins at the START step and continues to step 402, where the handle 110 of the cart 100 is engaged. The handle 110 may be engaged by applying a force to the handle 110. The force may be applied to the handle 110, directly or indirectly, by a user. Depending on how the handle is mechanically coupled to the cart frame 102 and the linking device 134, as well as the configuration of the remainder of the brake release mechanism 300, the force applied to the handle 110 may need to be in one or more particular directions and/or applied to one or more particular portions of the handle 110. The force applied to the handle 110 may be the same force as, or a different force then, a force used to move the cart 100.

In certain exemplary embodiments, in order to engage the handle 110, the force applied to the handle 110 is larger than an opposing force applied by one or more components (e.g., a compression spring) of the brake release system, where the one or more components are used to keep the chocks 130 engaged with the wheel surface 12 and the ground surface 190. Such an opposing force is applied to the handle to disengage the handle, and thus disengage the brake release mechanism. When the force is applied to the handle 110, a pair of chocks 130, coupled to the handle 110 and positioned proximate to a wheel 125 of the cart 100, are lifted.

In step 404, a force is applied to the cart frame 102 to move the cart 100. The force is applied while the handle 110 is engaged. The force applied to the cart frame 102 may be the same force or a different force than the force applied to the handle 110 to engage the handle 110. The force applied to the cart frame 102 is applied, directly or indirectly, by a user. The force applied to the cart frame 102 may applied to any suitable portion of the cart frame 102 in any suitable direction and/or magnitude. The force applied to the cart frame 102 moves the cart because, in part, the brake release system 300 is engaged while the handle 110 is engaged.

In step 406, the handle 110 of the cart 100 is disengaged. The handle 110 of the cart 100 is disengaged when the force applied to the handle 110 is removed. When the force is no longer applied to the handle 110, the pair of chocks 130, coupled to the handle 110 and positioned proximate to a wheel 125 of the cart 100, are lowered. In other words, when the force is no longer applied to the handle 110, the brake release system 300 is disengaged. As a result, when the handle 110 is disengaged, the chocks 130 are wedged between the wheel surface 126 and the ground surface 190, pinning the wheel 125 in place. So, when the handle 110 is disengaged, the cart 100 no longer moves when the force described above with respect to step 404 is applied to the cart frame 102.

Exemplary embodiments described herein provide for a cart braking system. Specifically, exemplary embodiments are directed to brake release mechanisms for a cart that are actively engaged to allow a cart to move. Exemplary embodiments provide safety benefits when the cart is positioned on an uneven surface and/or when an unintended force is applied to the cart, causing the cart to move. In such a case, the cart may pose a safety hazard when the cart moves at an unintended time. Exemplary embodiments are particularly useful when the cart carries a considerable amount of weight, as with a power cart.

Although the embodiments herein are described with reference to preferred and/or exemplary embodiments, it should be appreciated by those skilled in the art that various modifications are well within the scope and spirit of this disclosure. From the foregoing, it will be appreciated that embodiments herein overcome the limitations of the prior art. Those skilled in the art will appreciate that the exemplary embodiments are not limited to any specifically discussed application and that the embodiments described herein are illustrative and not restrictive. From the description of the exemplary embodiments, equivalents of the elements shown therein will suggest themselves to those skilled in the art, and ways of constructing other embodiments will suggest themselves to practitioners of the art. Therefore, the scope of the exemplary embodiments is not limited herein.

What is claimed is:

1. A braking system for a cart, the braking system comprising:
   a pair of chocks positioned proximate to a wheel of a wheel assembly, wherein the wheel assembly is coupled to a cart frame of the cart;
   a handle mechanically coupled to the cart frame, wherein the handle has an engaged position when a force is applied to the handle, wherein the handle has a disengaged position when no force is applied to the handle, and wherein the force applied to the handle is also used to move the cart; and
   a brake release mechanism coupled to the pair of chocks and the handle, wherein the brake release mechanism comprises:
      a bracket assembly coupled to the pair of chocks, wherein the bracket assembly comprises:
         a slotted portion;
         a first pair of crossing rods positioned adjacent to an outside-facing side of the wheel, wherein each of the first pair of crossing rods comprises a first end and a second end, wherein the first end of each of the first pair of crossing rods is coupled to one of the pair of chocks, and wherein the second end of each of the first pair of crossing rods is slidably coupled to the slotted portion of the bracket assembly; and
         a first nexus positioned where the first pair of crossing rods intersect; and
      a linking device comprising:
         a first end of the linking device coupled to a distal end of the handle; and a second end of the linking device coupled to the slotted portion of the bracket assembly, wherein the wheel assembly comprises a wheel base and a fork that couples the wheel to the wheel base, wherein the wheel base is coupled to the cart frame and the first nexus, wherein, when the handle is in the disengaged position, the pair of chocks are engaged with the wheel and the brake release mechanism is disengaged, and wherein, when the handle is in the engaged position, the pair of chocks are disengaged from the wheel and the brake release mechanism is engaged.

2. The braking system of claim 1, wherein, when the pair of chocks are engaged with the wheel, each chock of the pair of chocks is wedged between a wheel surface and a ground surface.

3. The braking system of claim 1, wherein, when the pair of chocks are disengaged from the wheel, each chock of the pair of chocks avoids contact with a wheel surface and a ground surface.

4. The braking system of claim 1, wherein the wheel is positioned toward an end of the cart where the handle is positioned.

5. The braking system of claim 4, further comprising:
an additional pair of chocks positioned proximate to an additional wheel of the cart, wherein the additional wheel is positioned toward the end of the cart where the handle is positioned.

6. The braking system of claim 1, wherein the bracket assembly further comprises:
a pulley rotationally coupled to the first nexus, wherein the linking device is flexible and wraps around at least a portion of the pulley.

7. The braking system of claim 1, wherein the bracket assembly further comprises:
a spring bracket coupled to the cart frame and positioned above the slotted portion;
a spring coupled to the slotted portion and the spring bracket.

8. The braking system of claim 1, wherein the bracket assembly further comprises:
a second pair of crossing rods positioned adjacent to an inside-facing side of the wheel, wherein each of the second pair of crossing rods comprises a third end and a fourth end, wherein the third end is coupled to the one of the pair of chocks, and wherein the fourth end is coupled to the wheel base; and
a second nexus positioned where the second pair of crossing rods intersect and coupled to the wheel base.

9. The braking system of claim 8, wherein the first end of each of the first pair of crossing rods and the third end of each of the second pair of crossing rods are coupled by a pin, wherein the pin traverses a chock of the pair of chocks.

10. The braking system of claim 1, wherein the slotted portion is V-shaped.

11. The braking system of claim 1, wherein each of the pair of chocks are wedge-shaped.

12. The braking system of claim 1, further comprising:
a spring bracket coupled to the cart frame and positioned below the handle; and
a spring coupled to the handle and the spring bracket.

13. The braking system of claim 1, further comprising:
a locking feature configured to hold the handle in the engaged position.

14. The braking system of claim 1, wherein the handle is hingedly coupled to the cart frame using at least one fastening device.

15. A method for controlling a braking system for a cart, the method comprising:
applying a first force to the handle, wherein applying the first force to the handle engages the handle and lifts a pair of chocks coupled to the handle and positioned proximate to a wheel of a wheel assembly of the cart;
applying, while the handle is engaged, a second force to the handle of the cart to move the cart; and
removing the first force from the handle to disengage the handle and to engage the pair of chocks with the wheel of the cart,
wherein applying the second force to the handle of the cart when the handle is disengaged fails to move the cart,
wherein the handle is coupled to a brake release mechanism comprising:
a bracket assembly coupled to the pair of chocks, wherein the bracket assembly comprises:
a slotted portion;
a first pair of crossing rods positioned adjacent to an outside-facing side of the wheel, wherein each of the first pair of crossing rods comprises a first end and a second end, wherein the first end is coupled to one of the pair of chocks, and wherein the second end is slidably coupled to the slotted portion of the bracket assembly; and
a first nexus positioned where the first pair of crossing rods intersect; and
a linking device comprising:
a first end of the linking device coupled to a distal end of the handle; and
a second end of the linking device coupled to the slotted portion of the bracket assembly,
wherein the wheel assembly comprises a wheel base and a fork that couples the wheel to the wheel base, wherein the wheel base is coupled to the cart frame and the first nexus of the bracket assembly.

16. The method of claim 15, wherein the first force is greater than a third force applied to the handle, wherein the third force disengages the handle.

17. The method of claim 15, wherein disengaging the handle comprises:
removing the second force from the handle, wherein each chock of the pair of chocks is wedged between a wheel surface of the wheel and a ground surface.

* * * * *